Dec. 28, 1937. M. C. INGE 2,103,536
STOPCOCK
Filed Sept. 4, 1936 2 Sheets-Sheet 1
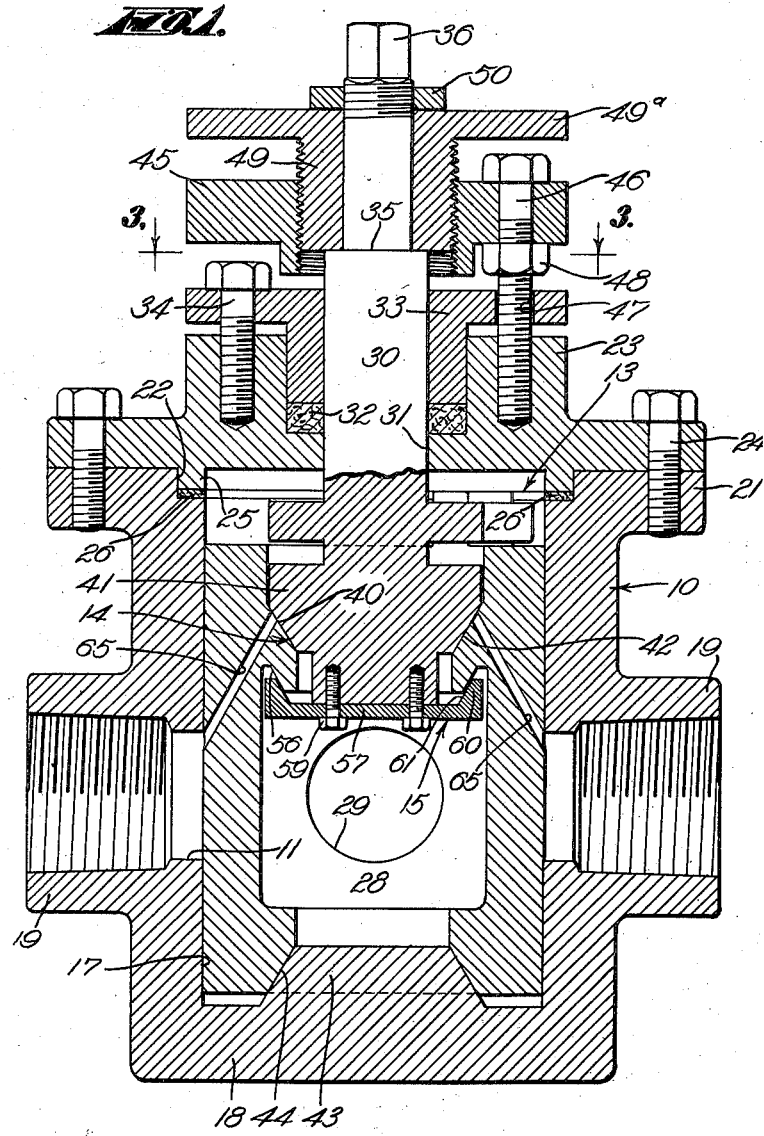
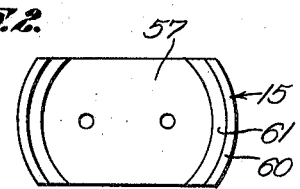
Inventor
MELVIN C. INGE
By
His Attorney Dec. 28, 1937.  M. C. INGE  2,103,536
STOPCOCK
Filed Sept. 4, 1936  2 Sheets-Sheet 2
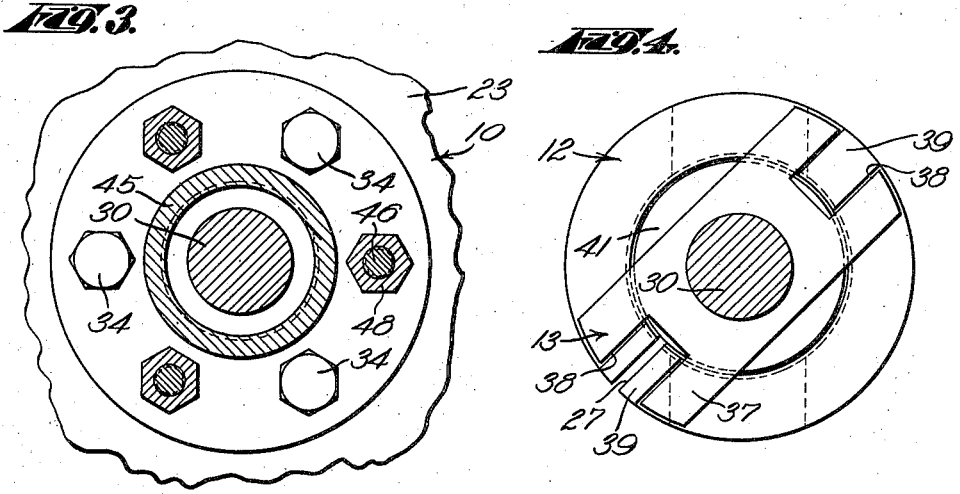
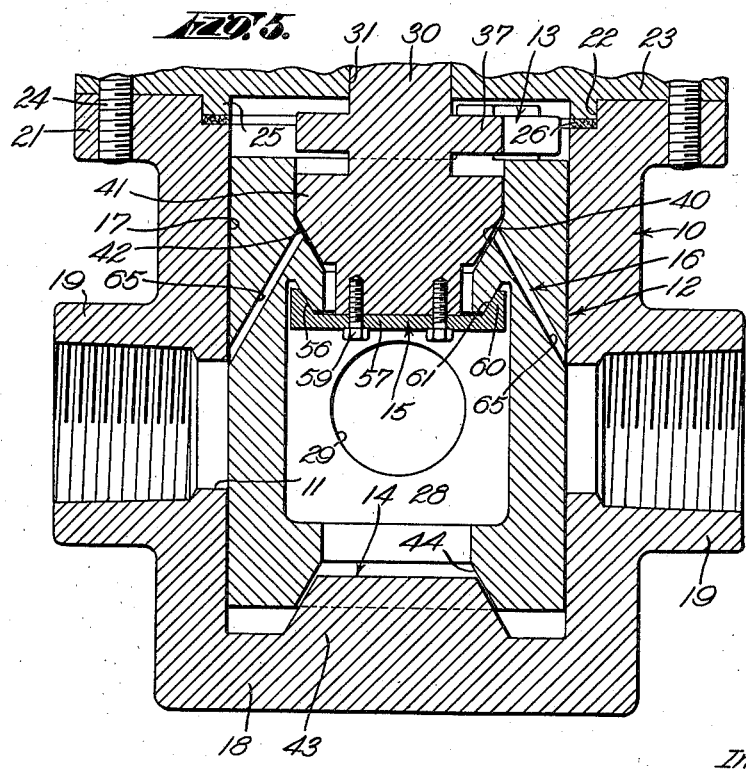
Inventor
MELVIN C. INGE
By
His Attorney Patented Dec. 28, 1937

2,103,536

UNITED STATES PATENT OFFICE 2,103,536

STOPCOCK

Melvin C. Inge, Brea, Calif.

Application September 4, 1936, Serial No. 99,331

8 Claims. (Cl. 251—101)

This invention relates to valves and relates more particularly to the class of valves known as stop cocks. A general object of this invention is to provide a stop cock that is effective and dependable and that is easy and convenient to operate.

Another object of this invention is to provide a stop cock embodying a cylindrical core or plug operable in a cylindrical opening in the body whereby it is easy to operate or turn.

Another object of this invention is to provide a stop cock having an expansible plug that may be expanded into sealing cooperation with the wall of the body opening when in the closed position and that springs out of engagement with the wall of the body opening when it is to be moved to the open position whereby it is easy to turn or operate.

Another object of this invention is to provide a stop cock of the character mentioned embodying novel and effective means for expanding the plug into fluid tight and pressure tight sealing engagement with the wall of the body opening.

Another object of this invention is to provide a stop cock of the character mentioned in which the plug may be lifted or freed to contract out of sealing cooperation with the wall of the body opening by simply turning a control stem.

Another object of this invention is to provide a stop cock of the character mentioned in which the internal and external fluid pressures on the plug are automatically balanced when the plug is freed or conditioned for turning from the closed position to the open position.

Another object of this invention is to provide a stop cock of the character mentioned in which one of the abutments or wedges for expanding the plug forms a valve for governing the pressure balancing ports.

Another object of this invention is to provide a stop cock of the character mentioned having means for simultaneously expanding the opposite end portions of the plug to assure the full even sealing engagement of the plug with the wall of the body opening.

Another object of this invention is to provide a stop cock of the character mentioned in which a single stem is employed to turn the plug and to expand and free the plug for contraction.

A further object of this invention is to provide a stop cock of the character mentioned that is simple and inexpensive and that embodies a minimum number of parts.

The various objects and features of my invention will be fully understood from the following detailed description of a typical preferred form and application of the invention, throughout which description reference is made to the accompanying drawings, in which:

Fig. 1 is a longitudinal detailed sectional view of the stop cock provided by the invention showing the plug in the closed and expanded condition. Fig. 2 is an elevation view of the freeing and contracting plate showing it removed from the valve. Fig. 3 is a transverse detailed sectional view taken substantially as indicated by line 3—3 on Fig. 1. Fig. 4 is a top or plan view of the plug and stem assembly removed from the body showing the stem in cross section, and Fig. 5 is a longitudinal detailed sectional view of the principal portion of the stop cock showing the plug in the freed and contracted position.

The stop cock provided by this invention includes, generally, a body 10 having a fluid passage 11, a turnable expansible plug 12 in the body 10 for controlling the passage 11, means 13 for turning the plug 12, means 14 for expanding the plug 12 to seal with the interior of the body 10, means 15 for freeing the plug for contraction and means 16 for balancing the internal and external pressures on the plug 12.

The body 10 may be varied considerably in shape and construction to adapt the stop cock for various installations. In the simple form of the invention illustrated the body 10 is a simple, integral member adapted to be interposed in a pipe line or conduit. A central cylindrical opening 17 of relatively large diameter extends into the body 10 from what I will term its outer end. The inner end of the opening 17 is closed by an integral wall 18 of the body. The fluid passage 11 extends through the body 10 at right angles to the opening 17 and intersects the opening. Means are provided at the opposite ends of the passage 11 for connecting with parts of a pipe line or conduit. In the particular structure illustrated internally threaded bosses 19 are provided on the body 10 at the outer ends of the passage 11 to receive pipe parts. A laterally or radially projecting flange 21 is provided on the body 10 at its outer end. An annular recess 22 is provided in the body 10 at the outer end of its opening 17. A bonnet or head 23 is secured to the outer end of the body 10 by screws 24 threaded in openings in the flange 21. The bonnet 23 has an annular tongue 25 extending into the recess 22 and cooperating with a suitable gasket 26 in the recess.

The core or plug 12 is the flow controlling member of the device and is turnable in the opening 17 between a position where it closes the passage 11 and a position where there may be free flow through the passage. In the preferred construction the plug 12 is a tubular member having a smooth unbroken cylindrical periphery. The opposite ends of the plug 12 may be flat and the plug is preferably proportioned so that its ends are within the opening 17. The periphery of the plug 12 is machined to accurately cooperate with the wall of the opening 17 to seal therewith and the plug is such that it tends to spring inwardly out of contact with the wall of the opening 17 through its inherent resiliency. In accordance with the invention the plug 12 is expansible and contractable. A longitudinal split or slot 27 extends through the wall of the tubular plug 12 and extends from one end of the plug to the other. The slot 27 renders the plug 12 flexible and expansible. The longitudinal opening 28 in the tubular plug 12 receives parts of the means 14 and the means 15, as will be hereinafter described. The plug 12 is provided with a transverse opening 29 for cooperating or registering with the passage 11 when the plug is in its open position. The opening 29 may be cylindrical and sufficiently large in diameter to fully register with the passage 11. The slot 27 and the opening 29 are related so that the slot 27 does not intersect the opening 29 and does not have direct communication with the body passage 11 when the plug is in the open or closed positions.

The means 13 for turning the plug 12 between its open and closed positions is a simple, manually operable means comprising a stem 30. The stem 30 is co-axial with the plug 12 and extends through a central opening 31 in the head 23. The head 23 carries packing 32 for sealing about the stem. A gland 33 is provided to compress the packing 32 and is urged against the packing by screws 34 threaded in openings in the head 23. The stem 30 projects outwardly beyond the gland 33 and its outer portion is reduced in diameter to present an outwardly facing annular shoulder 35. The extreme outer end portion 36 of the stem 30 is polygonal for ready engagement by a wrench or turning tool. A slack or loose connection is provided between the stem 30 and the plug 12 whereby the stem is operable to transmit turning forces to the plug and may have longitudinal movement relative to the plug. A flange 37 is provided on the stem 30 within the upper or outer portion of the body opening 17. The flange 37 extends outwardly to adjacent the wall of the opening 17 and may have flat parallel sides as illustrated in Fig. 4. A flat walled notch 38 is provided in each end of the flange 37. Lugs 39 project from the upper or outer end of the plug 12 and cooperate with the notches 38. The slot 27 may extend radially through one of the lugs 39. The lugs 39 cooperate with the notches 38 to allow relative movement between the stem 30 and the plug 12 in an axial direction. The flange 37 and the outer ends of the lugs 39 are spaced from the inner end of the head 23. The notches 38 cooperate with the lugs 39 for the transmission of turning movement between the stem 30 and the plug 12 so that turning of the stem results in turning of the plug.

The means 14 for expanding the plug 12 is operable by longitudinal movement of the stem 30 to expand or spread the plug into tight sealing cooperation with the wall of the opening 17. The means 14 includes a conical or frusto-conical surface 40 on the wall of the plug opening 28. A head or abutment 41 is provided on the stem 30 and has a tapered or frusto-conical surface 42 for cooperating with the surface 40. The means 14 further includes a central frusto-conical abutment 43 on the body wall 18. A conical surface 44 is provided on the inner end of the plug 12 to cooperate with the abutment 43. Cooperation of the surfaces 40 and 42 and the abutment 43 and surface 44 is operable to expand the split plug 12.

The plug expanding means 14 further includes means for effecting longitudinal movement of the stem 30. This means includes a ring or bracket 45 spaced outwardly from the gland 33 and surrounding the stem 30. The bracket 45 is carried by bolts 46 freely passing through openings 47 in the gland 33 and threaded into openings in the head 23. Nuts 48 are provided on the bolts 46 to engage the inner or under side of the bracket 45 to lock the bracket against movement. An actuator or nut 49 surrounds the reduced outer portion of the stem 30 and is threaded in the bracket 45. The nut 49 may have a polygonal flange 49ª engageable by a turning tool. The inner end of the nut 49 bears on the shoulder 35. A nut 50 is fixed to the stem 30 at the outer end of the nut 49. The shoulder 35 and the nut 50 prevent relative longitudinal movement between the stem 30 and the nut 49 so that threading of the nut 49 effects longitudinal movement of the stem 30. It is believed that it will be apparent how downward or inward threading of the nut 49 moves the stem 30 inwardly to effect the cooperation of the surfaces 40 and 42 and the cooperation of the surface 44 and the abutment 43 to expand the split plug 12 into tight sealing engagement with the wall of the body opening 17.

The means 15 is operable to free the plug 12 in a manner to allow it to contract out of contact with the wall of the body opening 17. The means 15 includes a downwardly and inwardly inclined surface 56 on the interior of the plug 12. A strip or plate 57 is secured to the inner end of the stem 30 by screws 59. The plate 57 is preferably out of alignment with the opening 29. The plate 57 is proportioned to be passed through the opening 29 when it is to be assembled on the stem 30. Lugs 60 are provided on the opposite ends of the plate 57 and have inclined surfaces 61 for cooperating with the inclined surface 56. Outward movement of the stem 30 by threading of the nut 45 brings the surfaces 61 into engagement with the surface 56 and continued outward movement of the stem 30 results in lifting of the plug 12 so that it is free to contract through its own resiliency. The cooperation of the surfaces 56 and 61 may assist in contracting the split plug 12.

The means 16 is operable to balance or equalize the pressures on the exterior and interior of the plug 12 when in the closed position, to make it easy to turn. The pressure balancing means 16 is very simple comprising ports 65 in the wall of the plug 12 extending from the surface 40 to the periphery of the plug. There are two ports 65 positioned to have their outer ends in communication with the upstream and downstream ends of the passage 11 when the plug 12 is in its closed position. The ports 65 are controlled by the surface 42 on the stem abutment 41. When the surface 42 is in contact with the surface 40 the upper or inner ends of the ports 65 are closed. When the stem 30 is moved upwardly or outwardly to free the plug 12 for turning the surface 42 may be unseated from the surface 40 to uncover the ports 65 to the interior of the plug 12 thus placing the interior of the plug in communication with the passage 11 so that the pressures on the plug are balanced. It is to be noted that the surface 42 assists in expanding the plug 12 as well as controls the ports 65.

It is believed that the operation of the stop cock provided by this invention will be understood from the foregoing detailed description. When the plug 12 is in the closed position illustrated in the drawings the nut 49 may be threaded downwardly or inwardly to move the stem 30 inwardly. Such inward movement of the stem 30 results in cooperation of the surfaces 40 and 42 and cooperation of the surface 44 with the abutment 43. The action of these inclined parts or conical surfaces and parts is to expand the split plug 12 so that its periphery tightly seals with the wall of the opening 17. The plug 12 may be expanded to have tight cooperation with the wall of the opening 17 to completely close off flow through the passage 11. The surface 42 cooperating with the surface 40 completely closes off the ports 65 so that the ports are closed when the plug is in the closed position. It will be noted that both ends of the plug 12 are simultaneously expanded so that the plug has even sealing engagement with the wall of the opening 17.

When it is desired to move the plug 12 to the open position the nut 49 is turned in a direction to move the stem 30 upwardly or outwardly. This outward movement of the stem 30 moves the surface 42 out of pressure engagement with the surface 40 uncovering the ports 65. This balances the internal and external fluid pressures on the plug 12. Upward or outward movement of the stem 30 removes the inward force on the plug 12 relieving the pressure engagement between the surface 44 and the abutment 43. Under some conditions the plug 12 may contract through its inherent resiliency when the expanding pressures are relieved as just described. The stem 30 may be moved outwardly a greater distance to bring the surfaces 61 into active engagement with the surface 56 so that the stem 30 may lift the plug 12. Such lifting of the plug fully frees it from the abutment 43, as illustrated in Fig. 5 so that it is free to contract to its normal state out of engagement with the wall of the opening 17. The plug 12 may then be easily turned by engaging the polygonal portion 36 of the stem with a suitable turning tool. As the pressures on the plug 12 are fully balanced and the plug is entirely freed from the wall of the opening 12 it is very easily turned. It is to be noted that the packing 32 may be replaced or repaired without disturbing the sealing engagement of the plug 12 with the wall of the opening 17. The stop cock provided by this invention provides a positive dependable seal and is very easy to operate.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A stop cock including, a body having a fluid passage and an opening intersecting the passage, an expansible plug turnable in the opening to control the passage, means for expanding the plug to seal with the wall of the opening, means for equalizing the internal and external pressures on the plug, and a single means for expanding the plug and controlling the last mentioned means.

2. A stop cock including, a body having a fluid passage and an opening intersecting the passage, an expansible and contractible hollow plug in the body for controlling the passage, means for expanding the plug, means for effecting longitudinal movement of the plug to free it for contraction, means for turning the plug, a single stem for operating the two aforenamed means, and means for equalizing the internal and external pressures on the plug including walls in the plug defining a port for communicating with the passage and the interior of the plug, and a valve on the stem for controlling said port.

3. A stop cock including, a body having a fluid passage and an opening intersecting the passage, an expansible plug turnable in the opening to control the passage, a pitched surface on the plug, the plug having a port extending from its periphery to said surface to balance the internal and external fluid pressures on the plug, an operating stem, and a part on the stem for cooperating with said surface to expand the plug and control said port.

4. A stop cock including, a body having a fluid passage and a cylindrical opening intersecting the passage, a cylindrical tubular plug turnable in the opening to control the passage, the plug being axially shiftable and longitudinally split to be expansible, the plug having a port through its wall to equalize the internal and external pressures on the plug, a wedge element cooperable with the plug to expand it and to control the port, and means for turning the plug.

5. A stop cock including, a body having a fluid passage and a cylindrical opening intersecting the passage, a cylindrical tubular plug turnable in the opening to control the passage, the plug being axially shiftable and split to be expansible, an internal conical surface on the plug, the plug having a port extending from its periphery to said surface to equalize the internal and external pressures on the plug, a wedge element cooperable with the said surface to expand the plug and to control the port, means for shifting the plug axially to free it for contraction and to uncover said port, and means for turning the plug.

6. A stop cock including, a body having a fluid passage and a cylindrical opening intersecting the passage, a cylindrical tubular plug turnable in the opening to control the passage, the plug being axially shiftable and split to be expansible and to contract away from the wall of the body opening through its inherent resiliency, the plug having a port through its wall to equalize the internal and external pressures on the plug, a wedge element cooperable with the plug to expand it and to control the port, a turnable and axially shiftable stem carrying the wedge element, means for transmitting axial movement from the stem to the plug in a direction to free it for contraction, and cooperating surfaces on the stem and plug for transmitting turning movement from the stem to the plug.

7. A stop cock including, a body having a fluid passage and a cylindrical opening intersecting the passage, a cylindrical tubular plug turnable in the opening to control the passage, the plug being axially shiftable and split to be expansible and to contract away from the wall of the body opening through its inherent resiliency, and an internal conical surface on the plug, the plug having a port extending from its periphery to said surface to equalize the internal and external pressures on the plug, a wedge element cooperable with the said surface to expand the plug and to control the port, a turnable and axially shiftable stem carrying the wedge element, means for transmitting axial movement from the stem to the plug in a direction to free it for contraction, screw means for moving the stem axially, and cooperating surfaces on the stem and plug for transmitting turning movement from the stem to the plug.

8. A valve including, a body having a fluid passage and an opening intersecting the passage, an axially split tubular plug in the opening having a transverse opening for communicating with the passage and turnable to control the passage, a turnable and axially shiftable stem entering the body, cooperable wedge surfaces on the stem and plug for expanding the plug, the plug having by-pass ports extending from its periphery to the wedge surface of the plug to equalize the pressures on the plug when the said surfaces are moved apart, the ports being located to communicate with the body passage at the opposite sides of the plug when the plug is in the closed position, cooperable rotation transmitting parts on the stem and plug, and means for turning the stem and for shifting the stem axially.

MELVIN C. INGE.